United States Patent Office 3,557,110
Patented Jan. 19, 1971

---

3,557,110
METHYL SUBSTITUTED 3-THIENYL THIAZOLO PYRIMIDINES AND METHYL SUBSTITUTED 3-THIENYL IMIDAZO THIAZOLES
Paul L. Anderson, Denville, and Robert E. Manning, Mountain Lakes, N.J., assignors to Sandoz-Wander, Inc., Hanover, N.J., a corporation of Delaware
No Drawing. Filed Dec. 30, 1968, Ser. No. 788,018
Int. Cl. C07d 91/52
U.S. Cl. 260—251                                6 Claims

ABSTRACT OF THE DISCLOSURE

Methyl substituted 3-thienyl thiazolo pyrimidines and methyl substituted 3-thienyl imidazo thiazoles, e.g., 3-(2-[4-methylthienyl]) - 5,6 - dihydroimidazo[2,1-b]thiazole are prepared from 2-halo-acetyl methylthiophene and propylene thiourea or ethylene thiourea and are useful as anorexics.

---

This invention relates to novel heterocyclic compounds. More specifically, it relates to novel substituted 3-thienyl-5,6 - dihydroimidazo[2,1-b]thiazoles and corresponding 6,7-dihydro - 5H - thiazolo[3,2-a]pyrimidines, intermediates therefor, acid addition salts thereof, and processes for their preparation.

The compounds of the present invention may be represented by the formula:

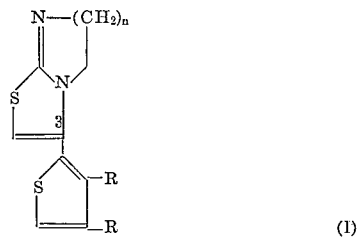

where:

$n$ represents 1 or 2, and
each R represents hydrogen or methyl, provided at least one R represents methyl.

The process for preparing compounds of Formula I may be generally represented as follows:

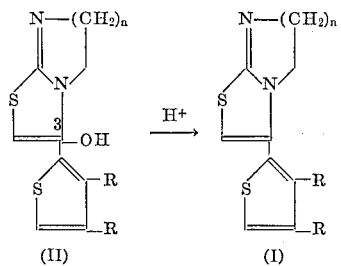

where $n$ and R have the above-stated significance.

The compounds of Formula I are prepared from the compounds of Formula II or an acid addition salt thereof in a manner known per se, by treatment with an acid such as hydrochloric acid, hydrobromic acid and acetic acid (preferably acetic acid) at a temperature to about 100° C., preferably 50° C. to 70° C. The reaction may be performed in solvent but use of solvent and the particular solvent utilized is not considered critical. Solvents which may be used are lower alkanols such as ethanol, isopropanol and the like, acetone, tetrahydrofuran, and similar inert solvents.

When the compounds of Formulas I are in the form of an acid addition salt they may be converted to the free base by conventional methods such as suspending the salt form in water and adding sodium carbonate.

The 3-hydroxy intermediates of Formula II are an aspect of this invention and may be prepared in acid addition salt form in accordance with the following reaction scheme:

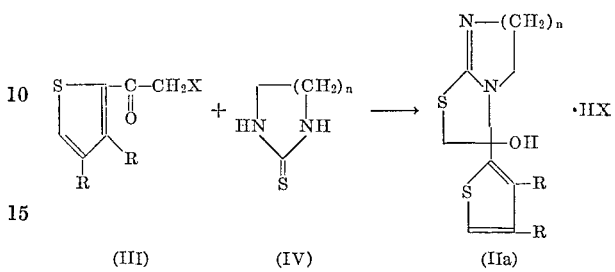

where $n$ and R have the above-stated significance and X is Br or Cl.

The compounds of Formula IIa are prepared by treating a 2-haloacetyl methyl thiophene (III) with a compound of Formula IV in an inert solvent such as acetone or lower alkanols having 1 to 5 carbon atoms, e.g., methanol or ethanol, at a temperature of 0°–60° C., preferably 10° to 35° C. Standard techniques may be used to recover the compounds (II). The particular solvent used is not critical in obtaining these 3-hydroxy intermediates (IIa).

When the compounds of Formula II above are recovered as their acid addition salts and it is desired to convert such salts to the corresponding free bases, conventional techniques may be utilized, e.g., dissolution of the salt in water and precipitation using a base such as sodium hydroxide. Standard techniques may also be used to convert the free base to a corresponding acid addition salt.

The compounds of Formula II may also be illustrated by their tautomeric equivalents as represented by the following structural formula:

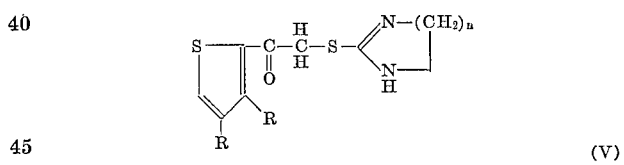

where R and $n$ have the above-stated significance, and it should be appreciated that these tautomers can exist in equilibrium. The predominant tautomer is believed to depend on such factors as whether the compound is a solid or in solution, and the pH and polarity of the environment. In order to simplify this description, however, Formula II only will be used, although both tautomeric forms are considered to be within the concept of the present invention.

It is further recognized that the compounds of Formula II exist as geometric and optical isomers, the separation and recovery of which may be accomplished employing conventional techniques. All of these isomers (geometric and optical) are included within the scope of this invention.

Certain of the compounds of Formula III are known and are prepared by methods disclosed in the literature. Those not specifically disclosed are prepared from known materials using analogous methods. The compounds of Formula IV are known.

The compounds of Formula I are useful because they possess pharmacological activity in animals. More particularly, the compounds are useful as anorexics as indicated by their activity in rat given 25 mg./kg. of active material and tested by use of the free feeding method described by Randall et al. (J.P.E.T., 129, 163, 1960) whereby 16 groups of six male Wistar rats are deprived of food for 18 hours but receive water ad libitum. Consumption of ground food is then measured over a four hour period following oral administration of the active compound.

For such use, the compounds (I) may be combined with a pharmaceutically acceptable carrier or adjuvant, and may be administered orally in such forms as tablets, capsules, elixirs, suspensions and the like, or parenterally in the form of an injectable solution or suspension. The dosage will vary depending upon the mode of administration utilized and the particular compound employed.

These compounds may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when the compounds are administered at a daily dosage of from about 0.015 to 25 milligrams per kilogram of animal body weight. This daily dosage is preferably given in divided doses, e.g., 2 to 4 times a day, or in sustained release form. For most large animals, the total daily dosage is from about 1 to 30 milligrams, and dosage forms suitable for internal administration comprise from about 0.25 milligram to about 15 milligrams of the compound in admixture with a solid or liquid pharmaceutical carrier or diluent.

A representative formulation suitable for oral administration is a tablet prepared by standard tabletting techniques which contains the following:

| Ingredients: | Parts by wt. |
|---|---|
| 3 - (2 - [3 - methylthienyl])-3-hydroxy-2,3,5,6-tetrahydroimidazo[2,1 - b]thiazole hydrobromide | 10 |
| Tragacanth | 2 |
| Lactose | 79.5 |
| Cornstarch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

3-(2-[3-methylthienyl])-5,6-dihydroimidazo-[2,1-b]-thiazole hydrochloride

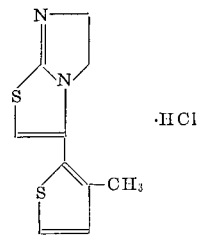

Step 1: 3-(2-[3-methylthienyl]-3-hydroxy-2,3,5,6-tetrahydroimidazo[2,1-b]thiazole hydrobromide.—To a solution of 2.7 g. of ethylene thiourea in 200 ml. of acetone is added with stirring at room temperature 5.8 g. of 2-bromoacetyl-3-methylthiophene in 25 ml. acetone. This mixture is stirred for 2 hours and the resultant solid filtered, washed with acetone and dried to provide 3-(2-[3 - methylthienyl]) - 3 - hydroxy - 2,3,5,6-tetrahydroimidazo[2,1-b]thiazole hydrobromide, M.P. 177° C. Recrystallization from methanol-ether (1:1) raises the M.P. to 181° C.

Step 2: 3-(2-[3-methylthienyl])-5,6 - dihydroimidazo-[2,1-b]thiazole hydrochloride.—A suspension of 6.5 g. of 3-(2-[3-methylthienyl])-3-hydroxy-2,3,5,6-tetrahydroimidazo[2,1-b]thiazole hydrobromide in 200 ml. of water is warmed and to this suspension is added with stirring 65 ml. of 2 normal sodium carbonate. The mixture is stirred at room temperature for two hours, filtered, and dried to some extent. The still moist crystals are suspended in 150 ml. of methanol, followed by addition of 35 ml. of concentrated hydrochloric acid with stirring. The solution is then refluxed for 4.5 hours and evaporated to a residue which is triturated with 25 ml. of acetone, filtered and washed with additional acetone to provide 3-(2-[3 - methylthienyl]) - 5,6 - dihydroimidazo[2,1 - b]-thiazole hydrochloride; M.P. 183–185° C. Recrystallization from methanol-ether (1:1) raises the M.P. to 186–187° C.

EXAMPLE 2

3-(2-[4-methylthienyl])-5,6-dihydroimidazo-[2,1-b]-thiazole hydrochloride

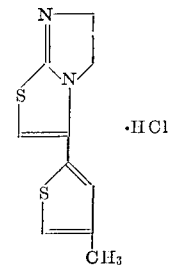

Step 1: 3-(2-[4-methylthienyl])-3-hydroxy-2,3,5,6-tetrahydroimidazo[2,1 - b]thiazole hydrobromide. — To a solution of 10.2 g. of ethylene thiourea in 750 ml. of acetone is added with stirring at room temperature 21.9 g. of 2-bromoacetyl-4-methylthiophene in 150 ml. of acetone. This mixture is stirred for 1.5 hours and the resultant solid filtered, washed with acetone and dried to provide 3-(2-[4-methylthienyl]) - 3 - hydroxy - 2,3,5,6-tetrahydroimidazo - [2,1-b]thiazole hydrobromide; M.P. 150° C. Recrystallization from methanol-ether (1:1) raises the M.P. to 165° C.

Step 2: 3-(2-[4-methylthienyl])-5,6 - dihydroimidazo-[2,1-b]thiazole hydrochloride.—To a suspension of 7.0 g. of 3-(2-[4-methylthienyl])-3-hydroxy-2,3,5,6-tetrahydroimidazo[2,1-b]thiazole hydrobromide in 250 ml. water is added with stirring at room temperature 70 ml. of 2 normal sodium carbonate. The mixture is stirred at room temperature for 2 hours, filtered, washed with water and dried to some extent. The damp crystals are then suspended in 250 ml. of methanol and 40 ml. of concentrated hydrochloric acid is added with stirring at room temperature. The solution is refluxed for 19 hours and evaporated to a residue which is triturated with 25 ml. of acetone, filtered, washed with acetone, and dried to provide 3-(2-[4 - methylthienyl]) - 5,6 - dihydroimidazo-[2,1-b]thiazole hydrochloride; M.P. 217° C. Recrystallization from methanol-ether (1:1) raises the M.P. to 233–234° C.

EXAMPLE 3

3-(2-[3-methylthienyl])-6,7-dihydro-5H-thiazolo-[3,2-a]pyrimidine hydrochloride

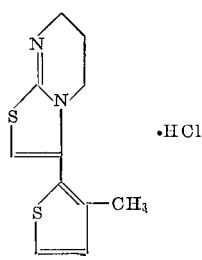

Step 1: 3-hydroxy-3-(2-[3-methylthienyl]) - 2,3,6,7-tetrahydro-5H-thiazolo[3,2 - a]pyrimidine hydrobromide.—To a solution of 11.6 g. of 3,4,5,6-tetrahydro-2-pyrimidinethiol in 900 ml. acetone is added with stirring at room temperature 21.9 g. of 2-bromoacetyl-3-methylthiophene in 100 ml. acetone. This mixture is stirred at room temperature for 2 hours and the resultant solid is filtered, washed with acetone and dried to provide 3-hydroxy-3-(2-[3-methylthienyl]) - 2,3,6,7 - tetrahydro - 5H-thiazolo[3,2-a]pyrimidine hydrobromide; M.P. 186–187°C.

Step 2: 3 - (2-[3-methylthienyl])-6,7-dihydro-5H-thiazolo[3,2-a]pyrimidine hydrochloride.—To a solution of 25.0 g. of 3-hydroxy-3(2-[3-methylthienyl])-2,3,6,7-tetrahydro-5H-thiazolo[3,2-a]pyrimidine hydrobromide in 1 liter of water is added with stirring at room temperature 250 ml. of 2 N sodium carbonate. The mixture is stirred at room temperature for 2 hours, filtered, washed well with water and dried to some extent. The crystals are then suspended in 400 ml. of methanol, 125 ml. of concentrated hydrochloric acid is added and the solution refluxed for 4 hours and stirred at room temperature for an additional 15 hours. The solution is then evaporated to a residue, triturated with 100 ml. of acetone, filtered, washed with acetone and dried to provide 3-(2-[3-methylthienyl])-6,7-dihydro - 5H - thiazolo[3,2-a]pyrimidine hydrochloride; M.P. 283–285° C.

What is claimed is:

1. A compound of the formula:

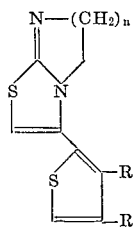

where:

$n$ represents 2, and

R represents hydrogen or methyl, provided at least one R represents methyl, or a pharmacologically acceptable acid addition salt thereof.

2. A compound of the formula:

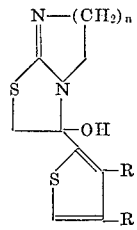

or a pharmaceutically acceptable acid addition salt thereof, where:

$n$ represents 1 or 2, and

R represents hydrogen or methyl, provided at least one R represents methyl.

3. The compounds of claim 1 which is 3-(2-[3-methylthienyl])-6,7-dihydro-5H-thiazolo[3,2-a]pyrimidine.

4. The compound of claim 2 which is 3-(2-[3-methylthienyl])-3-hydroxy - 2,3,5,6 - tetrahydroimidazo[2,1-b]thiazole.

5. The compound of claim 2 which is 3-(2-[4-methylthienyl])-3-hydroxy - 2,3,5,6 - tetrahydroimidazo[2,1-b]thiazole.

6. The compound of claim 2 which is 3-hydroxy-3-(2-[3-methylthienyl])-2,3,6,7 - tetrahydro - 5H-thiazolo[3,2-a]pyrimidine.

References Cited
UNITED STATES PATENTS 3,169,970 2/1965 Snyder _____ 260—247.1
3,274,209 9/1966 Raeymaekers et al. __ 260—306.7

NICHOLAS S. RIZZO, Primary Examiner

R. V. RUSH, Assistant Examiner

U.S. Cl. X.R.

260—306.7, 332.3; 424—251, 270